United States Patent

Dolomont

[15] 3,676,309

[45] July 11, 1972

[54] ALUMINUM WELDING WIRE ELECTRODE WITH AN ALUMINA COATING CONTAINING PHOSPHATE

[72] Inventor: Allan A. Dolomont, Branford, Conn.

[73] Assignee: Olin Mathieson Chemical Corporation

[22] Filed: Feb. 4, 1970

[21] Appl. No.: 12,505

Related U.S. Application Data

[60] Division of Ser. No. 712,586, March 13, 1968, Pat. No. 3,519,779, Continuation-in-part of Ser. No. 650,547, June 30, 1967, Pat. No. 3,378,669, which is a continuation-in-part of Ser. No. 339,853, Jan. 24, 1964, abandoned, Continuation-in-part of Ser. Nos. 374,290, June 11, 1964, abandoned, and Ser. No. 339,880, Jan. 24, 1964, Pat. No. 3,378,668.

[52] U.S. Cl............................204/27, 148/6.27, 204/28, 204/58, 204/140.5, 219/74

[51] Int. Cl......................C23b 5/58, C23b 9/02, C23b 3/06

[58] Field of Search....................204/58, 28, 140.5; 117/202–207; 148/6.27, 6.15, 31.5

[56] References Cited

UNITED STATES PATENTS

| | | | |
|---|---|---|---|
| 3,378,668 | 4/1968 | Dolomont | 204/28 |
| 3,378,669 | 4/1968 | Dolomont | 204/28 |
| 3,531,381 | 9/1970 | Amore et al. | 204/38 |
| 2,477,841 | 8/1949 | Ward | 148/6.15 |
| 2,681,402 | 6/1954 | Muller | 117/202 |
| 2,703,781 | 3/1955 | Hesch | 204/58 |
| 2,918,416 | 12/1959 | Taylor | 204/58 |
| 3,146,133 | 8/1964 | Lantoin | 148/6.15 |
| 3,348,979 | 10/1967 | Murphy et al. | 117/202 |

Primary Examiner—T. Tung
Assistant Examiner—T. Tufariello
Attorney—Henry W. Cummings, Robert H. Bachman and Richard S. Strickler

[57] ABSTRACT

An aluminum welding wire having a coating thereon and capable of producing porosity free welds after exposure to an atmosphere of 95 percent relative humidity at 100° F. for 30 full days wherein the coating is from 10 to 90 angstrom units thick and consists essentially of alumina and at least 0.001 percent by weight of phosphate.

2 Claims, No Drawings

ALUMINUM WELDING WIRE ELECTRODE WITH AN ALUMINA COATING CONTAINING PHOSPHATE

This application is a division of copending application Ser. No. 712,586, filed Mar. 13, 1968 now U.S. Pat. No. 3,519,779.

The present application is a continuation-in-part of copending application Ser. No. 650,547, filed June 30, 1967, now U.S. Pat. No. 3,378,669, which, in turn, is a continuation-in-part of Ser. No. 339,853, filed Jan. 24, 1964, now abandoned. The present application is also a continuation-in-part of Ser. No. 374,290, filed June 11, 1964, now abandoned, and Ser. No. 339,880, filed Jan. 24, 1964 and now U.S. Pat. No. 3,378,668.

The present invention relates to new and improved aluminum welding wire and more particularly to a new and improved aluminum welding wire which yields a high quality, non-porous weld bead when used in welding components of aluminum articles.

A high quality aluminum weld wire must have welding characteristics such that it deposits a weld bead which is smooth and of uniform width. This requirement is particularly critical when the joint to be welded is of sufficient thickness to require a number of weld passes.

It must also exhibit a sufficiently wide cleaning action (oxide removal) on the plate which is being welded, produce welds which are bright and deposits little or no spatter.

Equally important is that the weld beads be free of porosity. A high quality wire must have these features not only when initially treated but after storage for a considerable period, for example, during a six-month storage period, in various atmospheres.

My work has shown that the above requirements (assuming that the welding equipment is operating satisfactorily and that the wire is free of mechanical defects) are dependent on the oxide film on the wire.

Wire having an oxide film which is of non-uniform thickness will result in a fluctuating arc length. This fluctuating arc results in weld beads which are rough and non-uniform. Porosity can result from a fluctuating arc length. A fluctuating arc can also occur when the oxide film is non-uniformly hydrated.

A uniformly hydrated oxide film usually results in a steady arc length. However, the weld will contain porosity and often have a rough surface. The rough surface in this case is thought to be due to the hydrogen from the hydrated oxide film diffusing to the weld surface at the moment of solidification of the weld.

Aluminum weld wire is generally produced in the following manner. Round bars, for example, two and one-half inches diameter are continuously cast in approximately 30 foot lengths. These are then heated to a temperature dependent on the alloy and rolled, for example, to ⅜ inch diameter. This rod is then drawn through a series of dies so that its diameter is reduced to the required size.

However, because of work hardening effects it is not possible to draw the wire to finished size in one operation. After a certain amount of reduction (dependent upon the alloy) it is necessary to anneal the rod and then complete the drawing operation. The drawing operation is such that it is necessary to use large quantities of drawing lubricants. These are fairly complex lubricants and are not easily removed from the wire surface.

It is also possible during the drawing operation to get particles of aluminum oxide trapped in the die. These result in gouges and scratches in the wire surface which trap the lubricant. Subsequent drawing may seal these gouges and scratches resulting in the lubricant being trapped under the wire surface. The annealing operation can crack the drawing lubricant leaving carbon particles in the wire surface. These carbon particles are cathodic to the aluminum and in the presence of moisture or humid atmospheres will accelerate hydration.

The drawing operation must therefore be followed by a treatment process which will give the following results:

1. Remove any drawing lubricant and residuals on the wire surface.
2. Remove the oxide film which was formed during the rolling and drawing operation.
3. Remove sufficient metal from the wire surface that all entrained lubricant and carbon particles are removed from the surface.
4. Produce a wire surface that is smooth and uniform.
5. Result in the formation of a new oxide which is non-hydrated and which is thin and compact.

Such a wire will, in the as-treated condition, have very good arc characteristics and will produce welds which are bright, uniform and porosity-free. This wire will also have excellent shelf life in that the oxide film will resist hydration when exposed to humid atmospheres.

Also, porosity in welds is generally of two types: firstly, voids resulting from entrapment of the shielding gases or atmosphere within the solidifying weld metal, and secondly, voids caused by the release of hydrogen from the solidifying weld metal.

The first source can be substantially reduced or completely eliminated by periodic checks on equipment and by making frequent control welds to establish that welding procedures are correct and uniform. As mentioned above, an important feature of the invention is the elimination of the porosity caused by the second source, i.e., formation of hydrogen bubbles within the weld bead.

These bubbles are caused by the introduction of hydrogen containing materials into the weld bead. During the welding, these materials are decomposed and the hydrogen so produced dissolves in the molten metal. Upon solidification, the lower solubility of the hydrogen in the solid metal results in the rejection of hydrogen in solution and the production of small voids in the weld.

It has been found that hydrogen-containing materials may enter the weld bead from a number of sources. The inert gases used in the welding are of such high purity that they can generally be discounted as a direct source of hydrogen. However, between the gas cylinder and the welding arc, atmospheric contamination may take place or water condensation may occur on the welding equipment. Preweld inspection can usually eliminate these sources of hydrogen.

A further source of hydrogen is contamination of the arc by the atmosphere mixing with the shielding gas. This can be eliminated by proper adjustment of the welding parameters.

Hydrogen may also enter the weld metal from the base plate; this source is usually controlled by the metal manufacture through proper casting and fabrication techniques.

Thus, it is apparent that the welding wires themselves are the main uncontrollable source of hydrogen causing porosity in aluminum welds. These wires are usually smaller than 0.125 inch in diameter and so have a large ratio of surface area to volume. This means that the wire surface or surface oxide can contribute considerable amounts of hydrogen from adsorbed, absorbed or hydrated water in the oxide. When the high rates of wire feed (for example, up to 500 inch per minute) used in welding aluminum are considered, it can be readily appreciated that contamination of the wire surface can be a major source of porosity.

It has become evident that there are two principal sources of hydrogen-containing materials on the surface of the welding wire. As mentioned above, in the production of the wire, ⅜ inch diameter rod, for example, is first drawn to 0.187 inch and subsequently passed through an annealing furnace. Lubricants of a particularly tenacious kind are used in drawing and are not usually removed before annealing. In the annealing furnace, at least some lubricants and their products of reaction are decomposed, thus leaving small carbon particles adhering to the surface of the wire. Additional drawing to final gages causes the particles to be drawn into the surface of the welding wire. Conventionally, the wire is then degreased by known methods, packed and shipped.

It has been found, however, that the conventional degreasing processes do not remove the carbon particles nor the lubricant residues from the final draw. In subsequent storage the carbon particles act as cathodic stimulators of corrosion acting as cathodes in small local galvanic cells. These allow aluminum in the presence of moisture to act as an anode and produce an aluminum hydroxide or hydrous oxide film. It is the water in this film which breaks down in subsequent welding to produce free hydrogen which produces porosity upon freezing of the molten metal in the weld bead.

It has also been found that even in the absence of the cathodic stimulators of corrosion, the oxide film normally on the wires can and does take up water to produce a hydrous and hydrated oxide, particularly during long periods of storage. Again, when the wires are used in welding, the water from the film is decomposed by the welding arc and forms relatively large amounts of free hydrogen which is readily taken up by the molten weld metal. The freezing of the weld metal results in the rejection from solid solution of that quantity of hydrogen which is above the solid solubility of hydrogen in the particular alloy. This rejection of hydrogen from solid solution results in weld metal porosity.

The removal of these lubricant is very difficult because, due to their complex nature, they cannot be removed by any one solvent. While chlorinated hydrocarbons will generally remove petroleum type lubricants, they are not effective with the lard oil types which are used in concentrations of up to 15 per cent to improve the surface appearance of drawn wire. Alcohols or other solvents are required to remove the latter. These methods, because of their complexity, are not economically feasible for mass production of welding wires. They are also ineffective in the removal of drawn-in-carbon residue resulting from the decomposition or cracking of the lubricants during intermediate annealing. As indicated above, this carbon residue is harmful in that it accelerates corrosion and hydration of the wire oxide film upon exposure to humid atmospheres.

The removal of drawing lubricants and carbon residues, together with the oxide film and some base metal can be successfully accomplished by etching in solutions such as sodium hydroxide. While this method has met with some degree of commercial acceptance, it has not found wide spread favor in view of the fact that the process is difficult to control and results in an unsatisfactory surface appearance.

Additionally, several processes for treating weld wire are described in U.S. Pat. No. 2,681,402, issued to Albert Muller on June 15, 1954. However, these processes have not been successful in avoiding the aforementioned problems, since the disclosure of the patent states that the treated wire should be either used promptly in a welding operation or packaged in a moisture-proof container.

Accordingly, it is an object of the present invention to provide an improved aluminum welding wire which overcomes the heretofore noted problems and disadvantages of the prior art and consistently yields high quality, non-porous weld beads.

It is a further object of the present invention to provide an improved aluminum welding wire which is free from deleterious contaminates which produce objectionable porosity in the weld metal.

It is a still further object of the present invention to provide an inexpensive, expeditious and economical process for producing the welding wire of the present invention.

It is a still further object of the present invention to provide an improved aluminum welding wire which is free from the hydrogen-containing materials normally present in conventionally produced wire, which materials result in hydrogen formed bubbles in the weld metal.

It is another object of the present invention to provide an improved aluminum welding wire characterized by having a very thin and uniform film on the wire surface.

It is another object of the present invention to provide an aluminum welding wire having an oxide film which is highly resistant to hydration and minimizes corrosion or adsorption of water while not interferring with the desired properties of the welding wire.

Further objects and advantages of the present invention will appear hereinafter.

In accordance with the present invention, it has now been found that the foregoing objects and advantages may be readily obtained and an improved aluminum welding wire provided which comprises: a core of an aluminum base alloy welding wire; and a coating thereon having a thickness of from 10–90 angstrom units and consisting essentially of alumina and a small but effective amount of phosphate, at least 0.001 percent by weight, having a rate of hydration sufficiently low that essentially porosity free welds are obtained after exposure to an atmosphere of 95 percent relative humidity at 100° F for 30 full days.

In addition to being highly protective against hydration and corrosion by humid environments, the alumina coating on the wire is very firmly bonded to the metal so that, for example, it is not removed in handling. Since the coating has been formed by an anodic process, as will be seen hereinafter, it has all the adherence of anodically formed oxides in thin films. This high degree of adherence is probably due to the fact that the oxide coating has been formed by direct conversion of the metal to the oxide rather than by deposition of any pre-formed oxide on the wire surface.

It has been found in accordance with the present invention that the foregoing coated wire surprisingly accomplishes all of the objects of the present invention, namely, for example, weld metal porosity is eliminated, resulting in improved properties of the welded metal and improved weld appearance.

Additionally, the weld wire of the present invention may be stored for six months and longer without providing an atmosphere controlled room and without packaging in a moisture-proof container.

The foregoing improved aluminum welding wire of the present invention may be conveniently prepared, for example, by a combination of the processes described in the above Dolomont patent application, Ser. No. 650,517, (continuation of 339,853) and Ser. No. 339,880, of which the present application is a continuation-in-part.

The first part of the process is that described in Dolomont application Ser. No. 339,853, which broadly teaches immersing the wire in a first aqueous alkaline solution containing an anode strip, continuously immersing the wire in a second aqueous alkaline solution containing a cathode strip, passing an electric current through the electrolytes while the wire is immersed therein; if desired, the wire may then be rinsed in cold water, immersed in a passivating and neutralizing acid bath, and again rinsed. The second part of the process is an acid electrolytic treatment, described hereinafter.

In said Dolomont application Ser. No. 339,853, in order to achieve the desired cleaning effects on the wire surface, the alkaline baths through which the wire is passed in the first part of the process are adjusted to have a titratable alkalinity ranging from that produced by 1 percent to 40 percent by weight NaOH with an optimum value of approximately 10 percent and a pH greater than 10. The solutions are generally prepared from any one, or a combination of several, of the compounds selected from one of two groups, either the alkali metal hydroxides an ammonium ion, or any alkali metal salt of a strong base and weak acid which hydrolyzes to an alkaline solution. Examples of the first group are hydroxides of sodium, potassium, lithium, rubidium, cesium and ammonium. Examples of the second group are sodium, potassium, lithium, rubidium and cesium salts of carbonates, phosphates and phosphites including polyphosphates and polyphosphites, and cyanides. It is, of course, possible to use mixtures of sodium hydroxide and other hydroxides as well as mixtures of hydroxides and alkali salts, in particular phosphates.

A preferred alkaline electrolyte has been found to be an aqueous solution of from 3 percent to 15 percent sodium hydroxide with the balance water and preferably a solution of about 10 percent has been found to achieve excellent results when other variables as set forth hereinafter have been properly adjusted.

While it is preferred to have the wire be the cathode in the first alkaline tank and the anode in the second alkaline tank, this polarity can be reversed, if desired.

It may be desirable in some situations to include certain additives in the alkaline solutions for specific purposes. For example, wetting agents may be added which increase the rate of oil removal. Such wetting agents must, of course, be stable in the solutions used. Also chelating agents such as EDTA (ethylendiaminetetra acetic acid) or its sodium salt, or sugar acids such as gluconic acid, may be added to prevent the formation of hard scale on tanks and heating coils.

The alkaline baths are generally maintained at a temperature ranging from room temperature to the boiling point of water, more commonly within the range of about 50° to 80° C and optimally at about 65° C. The temperature and concentration of the alkaline bath are generally adjusted to achieve a desired rate of metal removal in the electroetching process which takes place in the first tank. Since it is desirable to maintain metal removal as low as possible and still achieve an effective cleaning action, both alkaline concentration and temperature are adjusted to fairly low values in comparison to normal etching procedures.

While a resident immersion time ranging from 0.1 to 120 seconds has been found to be operable in achieving a desirable cleaning effect on the wire, an immersion time of 0.5 to 2 seconds with a fairly dilute solution and low operating temperature facilitates the arrangement of an efficient and high producing capacity apparatus.

With regard to current density at the anodically treated wire surface, depending upon the variables mentioned above, the current density may range 25 to 10,000 amps per square foot and a voltage of between 7 to 100 depending upon the distance between the electrodes, the concentration of electrolyte, and the operating temperature.

As the wire passes through the first and seconds tanks, which respectively have anode and cathode strips on the tank itself may take the place of these strips in the electric circuit, the wire becomes cathode in the first tank and anode in the second tank. This causes upon the application of power, a strong gas evolution at the wire in the first tank. This gas evolution has a scrubbing action on the wire which assists in the removal of the drawing lubricants and harmful residues. The gas evolution is caused by the electrolytic reduction of hydrogen to form gas bubbles which result in the scrubbing action. Some aluminum from the wire goes into solution, the amount depending on concentration, temperature and current density. Thus, a mild etching is also produced in the first tank. The extent of etching, as indicated above, can be controlled by controlling the time in solution and the concentration of the alkaline solution, or the extent of current density applied to the circuit. The etching action together with the gas scrubbing completely removes the drawing lubricants, oxide film, and harmful residues.

As the now cleaned wire passes from the first tank to the second tank, its polarity is changed and the wire becomes anode in the second tank. In the second tank, the wire is subjected to a mild electropolishing action which removes any hydrogen which may have entered the metal from the cathodic treatment in the first tank. Also, the positive charge in the wire repels any positively charged particles of dirt which may still adhere to the wire surface, together with any oxidizable impurities, such as metal deposits. If the current density is not sufficiently high, the wire will be subjected to an electroetching effect which results in uneven metal removal with a consequent undesirable appearance.

After emerging from the second tank, the resultant wire surface is exceptionally clean and free of contaminants which would otherwise have a deleterious effect upon the weld bead.

With regard to the passivating and neutralizing acid bath through which the wire may be passed after emerging from a cold water rinse following the anodic electrolytic bath, it has been found that a nitric, hydrofluoric or chromic acid solution having concentrations of these acids in the range of 2 to 70 per cent, are suitable for removing smut, and to neutralize any residue or hydroxide solution or other residue which may still be adhering to the wire surface. The acid bath may be limited to as short a time as necessary, usually a few seconds, to remove the aforementioned metal or hydroxide residue.

Subsequent to the acid bath, the wire may be passed through a second cold water rinse, after which it is ready for the acid electrochemical treatment.

In this part of the process, the wire is treated according to the process described in co-pending application Ser. No. 339,880, which broadly teaches immersing the aluminum welding wire in a first aqueous acid solution containing an anode strip, continuously immersing the wire in a second aqueous acid solution containing a cathode strip, applying an electric current to the strips as the wire passes through the respective solutions, rinsing the wire, drying the wire, and coiling the wire for shipment.

More specifically, the wire is guided into a first tank containing an acid solution consisting of sulfuric acid, phosphoric acid, or a mixture of the two, and water, the first tank also containing an anode strip. The wire is then guided out of this tank and into a second tank containing a similar, but not necessarily identical, acid solution and a cathode strip. If desired, the tanks can be substituted for the strips. Upon application of power, the wire is made cathode in the first tank and anode in the second tank, this arrangement facilitating the wire being made part of the electric circuit without the necessity of any direct or mechanical contact between the moving wire and stationary contact strips or brushes which might mar the surface of the wire or otherwise adversely affect its appearance. The wire being cathodic in the first tank has no material effect upon the processing of the wire; the arrangement merely facilitates the carrying of current into the wire in the electric circuit.

Subsequent to anodic treatment in the second tank, the wire is passed through another tank containing a suitable rinse solution such as cold water and then dried by hot air blast and suitably coiled or spooled.

With regard to differences between the first and second acid solutions, it should be noted that the first acid solution may consist of any salt solution or acid solution which will carry the current. In practice, however, the first tank usually contains a solution that is similar to, or at least contains no ions which would be foreign to, the second solution which is of prime importance in the electropolishing operation. Thus, if a phosphoric-sulfuric acid solution is used as the electropolishing solution in the second tank, a solution of phosphoric acid, sulfuric acid, or a mixture of the two, is used in the first tank. Similarly, in the case of other electropolishing electrolytes more fully described below, the first tank would contain solutions of the same ions but not necessarily at the same concentrations. Since the only purpose of the first tank is to avoid the necessity for mechanical contact for the passage of current into the wire, the only real requirement for the electrolyte in the first tank is that it be highly conducting in order to avoid resistance losses, and compatible with the ingredients in the second or electropolishing tank. The compatibility is important because of the high likelihood of carryover from the first tank into the second.

The electropolishing solutions to which the wire is subjected may be of any of a variety of compositions, including many concentration combinations of the phosphoric and sulfuric acids mentioned above, as well as phosphoric, sulfuric and nitric acid combinations, phosphoric, sulfuric, and chromic acid combinations. The solution may also include other acids such as hydrofluoric acid. Also, some alkaline electropolishing solutions, such as trisodium phosphate, may be used. Within the variety of compounds from which the electropolishing solutions can be made up, percentages of the various constituents may vary to suit the needs of particular circumstances depending upon the nature of the alloys selected for the welding wire and the extent of metal which must be removed and/or oxide coating deposition that is desired. In general, good coating oxides are achieved with solutions having a titratable acidity in the range corresponding to concentrations from 40 to 95 percent sulfuric acid.

A preferred solution in the second tank which has been found to yield good quality welding wire 10 to 90 percent phosphoric acid and 90 to 10 percent by weight sulfuric acid plus up to 20 percent water. For example, phosphoric acid 45 percent, sulfuric acid 45 percent with 10 percent water is optimumly used.

The temperature of the bath may be operated within the temperature range of 50° C to the boiling point of the solution. The preferable temperature depends upon the alloy being used.

While a resident immersion time ranging in the order of 0.1 second to 5 minutes has been found to be operable in achieving a desirable oxide coating effect on the wire, an immersion time of 0.5 to 1 second with a fairly concentrated solution and high operating temperature facilitates the arrangement of an efficient and high productive capacity apparatus.

Anodic current densities are applied in the range well known in the art for commercial electropolishing operations and vary depending upon the solutions selected. Generally, current densities will run in the range of 25 to 10,000 amps per square foot. The voltage at which the current is impressed also varies depending upon the distance between the electrodes, the electrolyte concentration and electrolyte temperature. Voltages vary within the range of about 7 to 100.

While the weld wire of the present invention may be processed according to the previously described technique (based on co-pending cases, Ser. Nos. 650,547 and 339,880), it has been found that the most efficient processing technique is as follows: making the weld wire the cathode in a basic electrocleaning solution which is conductive and which will dissolve some aluminum. The temperature of the basic tank should be from 50° C to the boiling point of the solution. The alkalinity of the solution may vary from 1 to 40 percent NaOH. Other hydroxides, such as potassium or ammonium hydroxide could be used with a comparable alkalinity. The concentration of dissolved aluminum in the basic tank must not exceed 20 grams per liter, preferably not above 15.

After passing through the basic tank, the wire is then passed through air, a water rinse and is then passed through an acid electropolishing tank. In this tank, the wire is the anode. This acid solution must be conductive and must be able to dissolve some aluminum. The solution must contain from 10 to 90 percent $H_2SO_4$ and from 90 to 10 percent $H_3PO_4$. The water content may be from 0 to 20 percent. It is to be emphasized that there must be some phosphoric acid in the solution to provide the necessary phosphate in the electropolished coating.

The preferred acid solution is to have about equal amounts of concentrated phosphoric and sulfuric acid.

The maximum amount of dissolved aluminum is 20 grams per liter and preferably below 15. The current density to be used varies from 25 to 10,000 amps per square foot with higher current densities being used with larger diameter wires.

After the wire passes through the acid tank, it is given a water rinse and is dried and coiled up for shipping.

It will be appreciated that while the four-tank process provides for greater control and will permit, for instance, extremely good cleaning in the two alkaline tanks and extra fine polishing in the acid tanks, the two-tank process is more efficient and economical and the results are just as satisfactory unless extremely dirty wire is encountered or an extra fine polish is required.

It is essential that some phosphoric acid be used in the acid electropolishing tank to provide phosphate in the alumina coating formed in the electropolishing tank. It is believed that the phosphate occupies cites which water would normally occupy if adsorbed during storage. Thus, the presence of the phosphate permits long storage of the weld wire without a protective atmosphere and still essentially porosity free welds are obtained.

The present invention may be conveniently applied to any conventional aluminum welding wire. One group of which is highly suitable for welding wire is the aluminum-iron-silicon group containing aluminum from 99.30 to 99.99 percent, balance impurities normal for this group, of which the 1000 and 1100 series of alloys are representative, e.g., containing from 0.1 to 1.5 percent total iron plus silicon. Another group is the 2000 series containing from 3 to 7 percent copper, 0.1 to 0.5 percent manganese, .05 to 0.5 percent titanium, balance aluminum plus impurities normal for this group. Another group is the 4000 series containing 3 to 14 percent silicon, either with or without 3 to 6 percent copper, balance aluminum plus normal impurities. And still another group is the 5000 series containing from 2 to 7 percent magnesium, balance aluminum plus normal impurities. Other preferred aluminum alloys are those containing from 2 to 5 percent zinc and from 1 to 4 percent magnesium. Generally, the aluminum welding wire is an aluminum base alloy containing over 82 percent aluminum.

The coated aluminum welding wire of the present invention contains thereon a very thin coating which consists essentially of alumina and a small but effective amount of phosphate, at least 0.001 percent. The film is essentially anhydrous alumina but may contain small concentrations of other oxides contributed by the alloying elements, for example, magnesium oxide, as well as small quantities of metallic aluminum. The film is quite thin and is sufficiently thin to pass current in the welding operation. The normal range of thickness is from 10 to 90 angstrom units, preferably 10 to 60 angstrom units.

The coated wire of the present invention has certain well-defined and critical characteristics. The coating is essentially anhydrous and non-hydratable or slowly hydratable. The coating is highly protective against corrosion.

The coated wire of the present invention is highly resistant to the growth of hydrated oxide corrosion products. This resistance may be measured by the extent that the weld wire has taken on water after storage in an atmosphere of 95 percent relative humidity at 100° F for a period of 30 full days, as described in the examples that follow.

The resistance of weld wire to hydration is determined by exposing loose coils of the wire to an atmosphere of 100° F and 90 percent relative humidity for 30 days. Welds made with wire exposed to this atmosphere for this time should be smooth, uniform, bright and free of porosity.

This particular atmosphere was chosen as being representative of the worst atmospheric storage conditions likely to be encountered. The 30 days exposure time was found to be the most suitable for evaluation purposes. Times shorter than this were found to result in non-uniform hydration of wires having this tendency. This resulted in scatter in the results and made the evaluation of different treatments difficult.

A wire that will withstand thirty days under our test conditions will withstand storage times longer than six months in any atmosphere it is likely to encounter.

The following examples illustrate the invention without limiting its scope.

EXAMPLE I

A sample of aluminum welding wire fabricated from alloy 5356 was suitably mounted in coil form on the electropolishing apparatus and was continuously passed through an aqueous solution of 15 percent sulfuric acid and water contained in a first tank having an anode strip suitably mounted therein.

The wire was withdrawn from this tank and immersed in a second solution containing 45 percent phosphoric acid, 45 percent sulfuric acid, and 10 percent water contained in a second tank having a cathode strip.

Both solutions were maintained at a temperature of 100° C with a current density of 1000 amps per square foot applied to the anode.

After withdrawal from the second tank, the wire was passed through a cold water rinse, dried by hot air blast and recoiled. The wire was passed through the various solutions at a rate of 30 feet per minute yielding a resident time of 7 seconds in each of the acid baths.

The treated wire was found to yield porosity free welds after storage in atmospheres of 95 percent relative humidity at 100° F even after periods of 30 to 60 days exposure.

EXAMPLE II

A sample of aluminum welding wire fabricated from alloy 5356 was continuously immersed in an aqueous solution of 10 percent sodium hydroxide at 65° C in a first tank containing an anode strip, was withdrawn from this tank and immersed in a second aqueous solution of 5 percent sodium hydroxide maintained at 65° C in a second tank containing a cathodic strip. A current density of 950 amps per square foot at 11 volts was applied to the anode.

The wire passed through the alkaline solutions, then through a water rinse, a nitric acid rinse, a second water rinse, and a drying and coiling operation at a rate of 40 feed per minute with a resident time of 7 seconds in each of the alkaline baths.

The dried and coiled wire was then stored for 30 days in an atmosphere of 95 percent relative humidity at 100° F.

After welding with this wire careful X-ray inspection of the weld bead showed no detectable porosity.

EXAMPLE III

Table I presents radiographic results of five weld wire processing techniques.

In each case, Aluminum Association Alloy 5356 wire of 1/16-inch diameter was used.

All the wires were exposed in an atmosphere of 100° F in 90 percent relative humidity for the time shown in Table I.

The radiographic ratings are presented both alphabetically and numerically. The quality of welds decreases as both the alphabetical and the numerical rating increases. The present standards for allowable porosity are in alphabetical rating of A– and a numerical rating of 3.

Wire Nos. I-V were produced by methods of the prior art. They were, in some cases, degreased, but in no case were they electrocleaned and electropolished according to the present invention. They represent various commercial weld wires.

Wire No. VI, on the other hand, was treated as follows: it was first passed through a basic electrocleaning in which the wire was made the cathode in the first tank and the anode in the second tank. The sodium hydroxide content of the solution was 100 grams per liter in both tanks and the aluminum concentration of the solution was maintained below 15 grams per liter in both tanks. The average current used was 70 amps in both tanks. The temperature was 75° C ± 3. The voltage was about 12 volts in both tanks.

After a water rinse, the wire was passed into the acid electropolishing tanks in which the weld wire was made the cathode in the first tank and the anode in the second tank. The first tank contained 50 percent sulfuric acid. The second tank contained 50 percent phosphoric acid and 50 percent sulfuric acid. The aluminum content of the solution was maintained below 15 grams per liter. The average current in both tanks was 3400 amps per square foot. The temperature of the acid tanks was 125 ± 2° C. The voltage was 60 volts and the current 350 amps.

The wire was passed through both tanks at 300 feet per minute. After emerging from the acid tank, the wire was passed through a water rinse and was then dried and then subjected to the 100° F, 90% relative humidity atmosphere mentioned above for the time shown in Table I.

TABLE I

A comparison of the porosity content of welds made using olin wire and five wires made by different processes after the wires were exposed to an atmosphere of 100° F and 90% relative humidity

| wire no. | weld no. | exposure time | radiograph rating (alphabetical & numerical) |
| --- | --- | --- | --- |
| I | 582 | 672 hours | B (5) |
| I | 584 | 672 hours | C+ (7) |
| I | 586 | 672 hours | B– (6) |
| I | 736 | 672 hours | Z (20) |
| I | 737 | 672 hours | Z (20) |
| II | 67 | 168 hours | C (8) |
| II | 68 | 168 hours | D (11) |
| II | 69 | 168 hours | D (11) |
| III | 76 | 336 hours | D (11) |
| III | 77 | 336 hours | E (13) |
| III | 107 | 720 hours | B– (6) |
| III | 112 | 720 hours | Z (20) |
| III | 111 | 720 hours | D (11) |
| IV | 118 | 672 hours | B (5) |
| IV | 119 | 672 hours | B (5) |
| IV | 682 | 672 hours | B (5) |
| IV | 683 | 672 hours | B (5) |
| IV | 684 | 672 hours | B+ (4) |
| V | 275 | 672 hours | C+ (7) |
| V | 276 | 672 hours | C (8) |
| V | 277 | 672 hours | B (5) |
| V | 278 | 672 hours | B– (6) |
| V | 279 | 672 hours | B– (6) |
| VI | C704 | 720 hours | A (2) |
| VI | C705 | 720 hours | A (2) |
| VI | C706 | 720 hours | A (2) |
| VI | C707 | 720 hours | A+ (1) |
| VI | C708 | 720 hours | A (2) |
| VI | C726 | 720 hours | A+ (1) |
| VI | C727 | 720 hours | A (2) |
| VI | C728 | 720 hours | A+ (1) |
| VI | C729 | 720 hours | A+ (1) |
| VI | C730 | 720 hours | A– (3) |
| VI | B565 | 720 hours | A+ (1) |
| VI | B566 | 720 hours | A+ (1) |
| VI | B567 | 720 hours | A (2) |
| VI | B568 | 720 hours | A (2) |
| VI | B569 | 720 hours | A (2) |

It is apparent from Table I that Wires I-V, often in considerably less time than the 720 hours, gave poor welds. In many cases, after only 168 hours (Wire No. II), the ratings were low. In other cases (Wires No. I and III), there was considerable variability; for example, some specimens of Wire No. I after 672 hours had a radiographic rating of 5, whereas others were as low as 20, but a value of 5 is sub-standard.

Thus, not only does the data establish that Wire No. VI, the wire of the present invention will withstand 30 full days at 100° F in 90 percent relative humidity, but also, Table I shows the variability and lack of reliability which is encountered with the other wires.

It is for this reason that the present invention is so valuable, because a customer can rely on the fact that the wire can be stored and will not take on water and yield porous welds.

EXAMPLE IV

Table II presents radiographic results of ten weld wires processed according to the following techniques.

In each case, Aluminum Association Alloy 5356 wire of 1/16-inch diameter was used.

Wires 1-10 were treated as follows: they were first passed through a basic electrocleaning tank in which the wire was made the cathode. The sodium hydroxide content of the solution was 100 grams per liter and the aluminum concentration of the solution was maintained below 15 grams per liter. The average current density of the tank was 3960 amps per square foot. The temperature was 75° C ± 3. The amperage was 350 ± 10 amps and the voltage varied from 30–60 volts.

After a water rinse, the wires were passed into an acid electropolishing tank in which the weld wire was made the anode. The tank contained 50 percent phosphoric acid and 50 percent sulfuric acid. The aluminum content of the solution was maintained below 14 grams per liter. The average current density in the tank was 3420 amps per square foot. The temperature of the acid tank was 125 ± 2° C.

The wires were passed through both tanks at 300 feet per minute. After emerging from the acid tank, the wires were passed through a water rinse and were then dried and then subjected to the 100° F, 90 percent relative humidity atmosphere for the time shown in Table II.

The radiographic ratings are presented both alphabetically and numerically. The quality of welds decreases as both the alphabetical and the numerical rating increases. The present standards for allowable porosity are an alphabetical rating of A– and a numerical rating of 3.

TABLE II

| Wire No. | weld no. | exposure time (24-hour days) | radiographic rating (alphabetical & numerical) |
|---|---|---|---|
| 1 | C735 | 30 days | A– (3) |
| 2 | C734 | 30 days | A (2) |
| 3 | C733 | 30 days | A (2) |
| 4 | C732 | 30 days | A (2) |
| 5 | C731 | 30 days | A+ (1) |
| 6 | C772 | 30 days | A (2) |
| 7 | C771 | 30 days | A+ (1) |
| 8 | C770 | 30 days | A+ (1) |
| 9 | C769 | 30 days | A+ (1) |
| 10 | C768 | 30 days | A (2) |

It is to be understood that the invention is not limited to the illustrations described and shown herein which are deemed to be merely illustrative of the best modes of carrying out the invention, and which are susceptible of modifications of form, size, arrangement of parts and detail of operation, but rather is intended to encompass all such modifications which are within the spirit and scope of the invention as set forth in the appended claims.

What is claimed is:

1. A welding wire for producing essentially porosity free welds comprising a core of an aluminum base alloy welding wire having a coating thereon, said coating having a thickness of from 10 to 90 angstrom units and consisting essentially of alumina and at least 0.001 percent by weight of phosphate.

2. A welding wire according to claim 1 in which said core is made of an aluminum base alloy welding wire containing at least 82 per cent aluminum.

* * * * *